United States Patent
Butler

(10) Patent No.: US 9,635,980 B2
(45) Date of Patent: May 2, 2017

(54) FAJITA MEAL SERVING APPARATUS

(71) Applicant: Brian Butler, Corsicana, TX (US)

(72) Inventor: Brian Butler, Corsicana, TX (US)

( * ) Notice: Subject to any disclaimer, the term of this patent is extended or adjusted under 35 U.S.C. 154(b) by 145 days.

(21) Appl. No.: 14/524,484

(22) Filed: Oct. 27, 2014

(65) Prior Publication Data

US 2016/0113444 A1    Apr. 28, 2016

(51) Int. Cl.
*A21B 1/52*    (2006.01)
*A47J 39/00*    (2006.01)

(52) U.S. Cl.
CPC .................................. *A47J 39/006* (2013.01)

(58) Field of Classification Search
CPC ........ A47J 39/006; A47J 39/02; A47J 41/005; A47J 39/025; A47J 41/0055; A47J 41/061; A47J 41/00; H05B 3/0014; B65D 25/02; B65D 25/28; B65D 25/005; B65D 25/06

See application file for complete search history.

(56) References Cited

U.S. PATENT DOCUMENTS

| | | | |
|---|---|---|---|
| D158,397 S | 5/1950 | Liebel | |
| D169,817 S | 6/1953 | Klein | |
| 3,610,884 A * | 10/1971 | Evans | A47J 27/004 126/246 |
| 3,636,299 A * | 1/1972 | Stewart, Jr. | A47J 27/004 108/94 |
| D230,810 S | 3/1974 | Ryan | |
| 4,010,736 A | 3/1977 | Sacomani | |
| 4,013,869 A | 3/1977 | Orts | |
| D246,278 S | 11/1977 | Forselius | |
| D297,897 S | 10/1988 | Stackhouse | |
| 4,782,745 A | 11/1988 | George, Jr. | |
| 4,834,470 A | 5/1989 | Pinnow | |
| D305,197 S | 12/1989 | Valdes | |
| 5,129,543 A | 7/1992 | White | |
| D368,627 S | 4/1996 | McSpadden | |
| 6,268,592 B1 | 7/2001 | Hu | |
| 6,588,655 B2 | 7/2003 | Stapleton | |
| D605,899 S | 12/2009 | Meether | |
| 8,674,269 B2 * | 3/2014 | Humphrey | H05B 1/0261 126/190 |
| 2005/0035109 A1 | 2/2005 | Thomas | |
| 2006/0196803 A1 | 9/2006 | Nash, Jr. | |
| 2006/0260473 A1 | 11/2006 | Nybakke | |

FOREIGN PATENT DOCUMENTS

DE    DT931462    8/1955

OTHER PUBLICATIONS

International Search Report and Written Opinion received in corresponding Patent Cooperation Treaty Application No. PCT/US15/56790, dated Jan. 19, 2016, 7 pages.

* cited by examiner

*Primary Examiner* — Shawntina Fuqua
(74) *Attorney, Agent, or Firm* — Wei Wei Jeang; Grable Martin Fulton PLLC

(57) ABSTRACT

A fajita meal serving apparatus comprises a thermally-insulative serving platter defining an upper recessed area configured for securely receiving and supporting a serving plate, a two-way drawer disposed in a cavity under the upper recessed area of the serving platter, where the two-way drawer defines a circular recess configured for holding tortillas. The apparatus further includes first and second diametrically opposed handles formed in the serving platter.

18 Claims, 6 Drawing Sheets

FAJITA MEAL SERVING APPARATUS

FIELD

The present disclosure generally relates to an apparatus for serving a fajita meal typically comprising fajita meat, tortillas, and a variety of toppings.

BACKGROUND

Texas is the proud home of an authentic regional cuisine, Tex-Mex food, and the fajita is a main component contributing to the popularity of Tex-Mex in American cuisine. According to Homero Recio, who did his graduate work in animal science at Texas A&M, there is anecdotal evidence of the skirt steak cooked directly on a campfire or on a grill referenced by the Spanish nickname that goes back as far as the 1930s in the ranch lands of South and West Texas. During cattle roundups, beef were butchered regularly to feed the ranch hands. Less valuable parts of the cattle such as the hide, the head, the entrails, and meat trimmings such as skirt were given to the Mexican vaqueros as part of their pay. This practice may have given rise to hearty border dishes like barbacoa de cabeza (head barbecue), menudo (tripe stew), and fajitas/arracheras (grilled skirt steak).

Fast forward to today, the fajita is one of the most popular dishes in many restaurants, which typically serve the meal on a very hot platter to the table. The flavorful dish would arrive from the kitchen to the table accompanied by loud sizzling noises, scintillating smell, and fanfare that elicit attention from all nearby diners. Because the cast iron platter is heated to high temperatures, it often scorches and damages the plywood underliner under the platter. The damages to the plywood underliner may lead to hard to clean and unsanitary surfaces. The fajita meal typically includes many side dishes such as Spanish rice, refried beans, and tortillas, and toppings such as sour cream, cheese, shredded lettuce, diced tomatoes, and guacamole. All of the hot platter, dishes, and plates holding these components of the fajita meal can easily overwhelm the limited space on a dining table. Often other diners' in the dining party must shuffle their plates, along with the chips and salsa, water glasses, etc. to allow the server to set the many parts of the fajita meal down on the table. If more than one person in the dining party order the fajita, then finding room for all the items becomes a real challenge.

DETAILED DESCRIPTION

Figure 1:
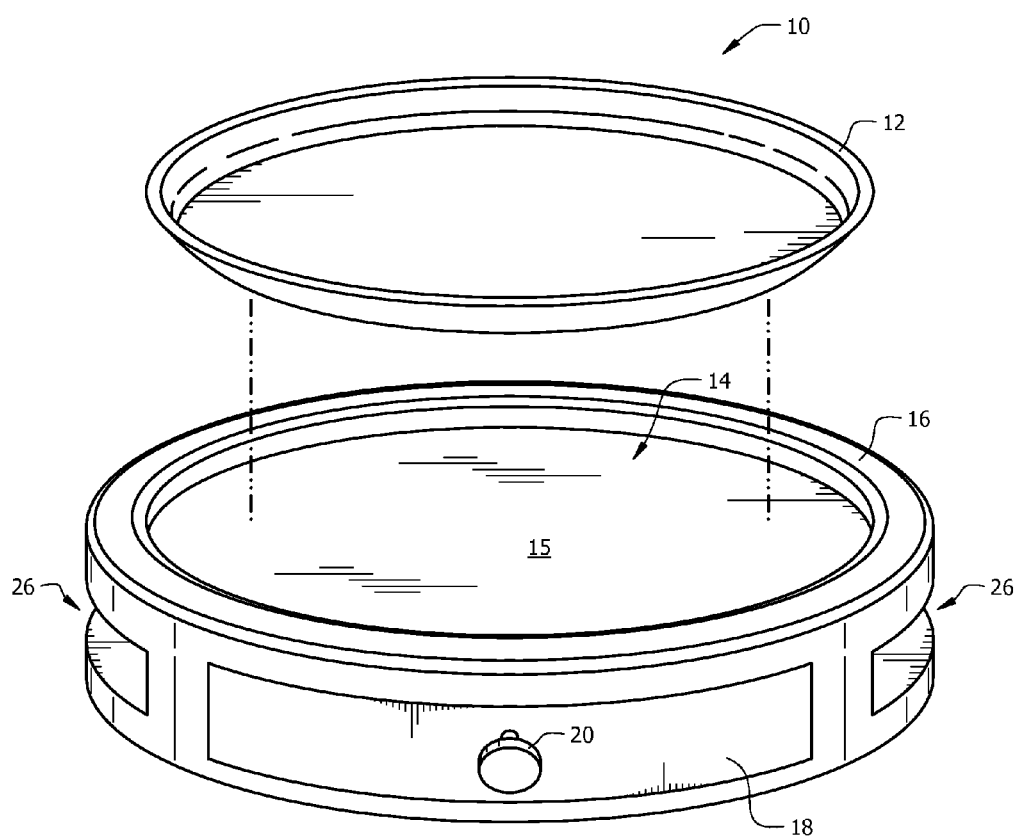
FIG. 1 is a perspective view of an exemplary embodiment of a fajita meal serving apparatus according to the present disclosure.

Referring to the accompanying FIGS. 1-8, a two-tiered fajita meal serving apparatus 10 includes a serving plate 12 that can be accommodated within a recessed area 14 defined in an upper surface of a serving platter 16 with a tortilla holding two-way drawer 18 disposed beneath the recessed area 14. Preferably, the serving plate 12 is oval or elliptical in shape, and is received within the recess 14 having the same shape and configuration. Of course, other shapes and configurations (circular, rectangular, square, etc.) are also contemplated. The recessed area 14 and its bottom floor 15 are sized with proper dimensions so that the serving plate 12 may sit securely in the recessed area 14 and cannot easily slide off. The serving plate 12 is preferably constructed of cast iron or like materials that can be heated to a high temperature and maintain the temperature for a prolonged period of time so that the fajita meat and accompanying grilled onions and bell peppers can be served sizzling hot at the dining table.

Figure 2:
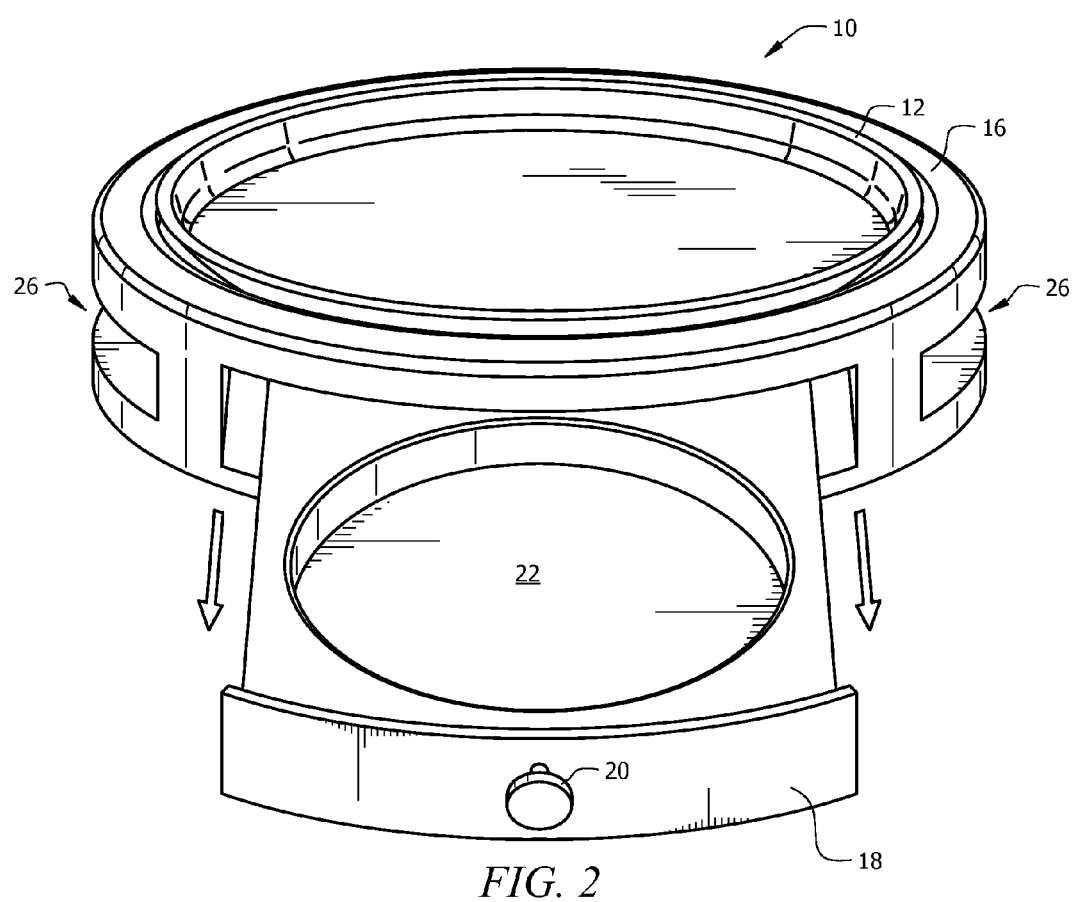
FIG. 2 is another perspective view of an exemplary embodiment of a fajita meal serving apparatus demonstrating the tortilla drawer feature according to the present disclosure.
Figure 3:
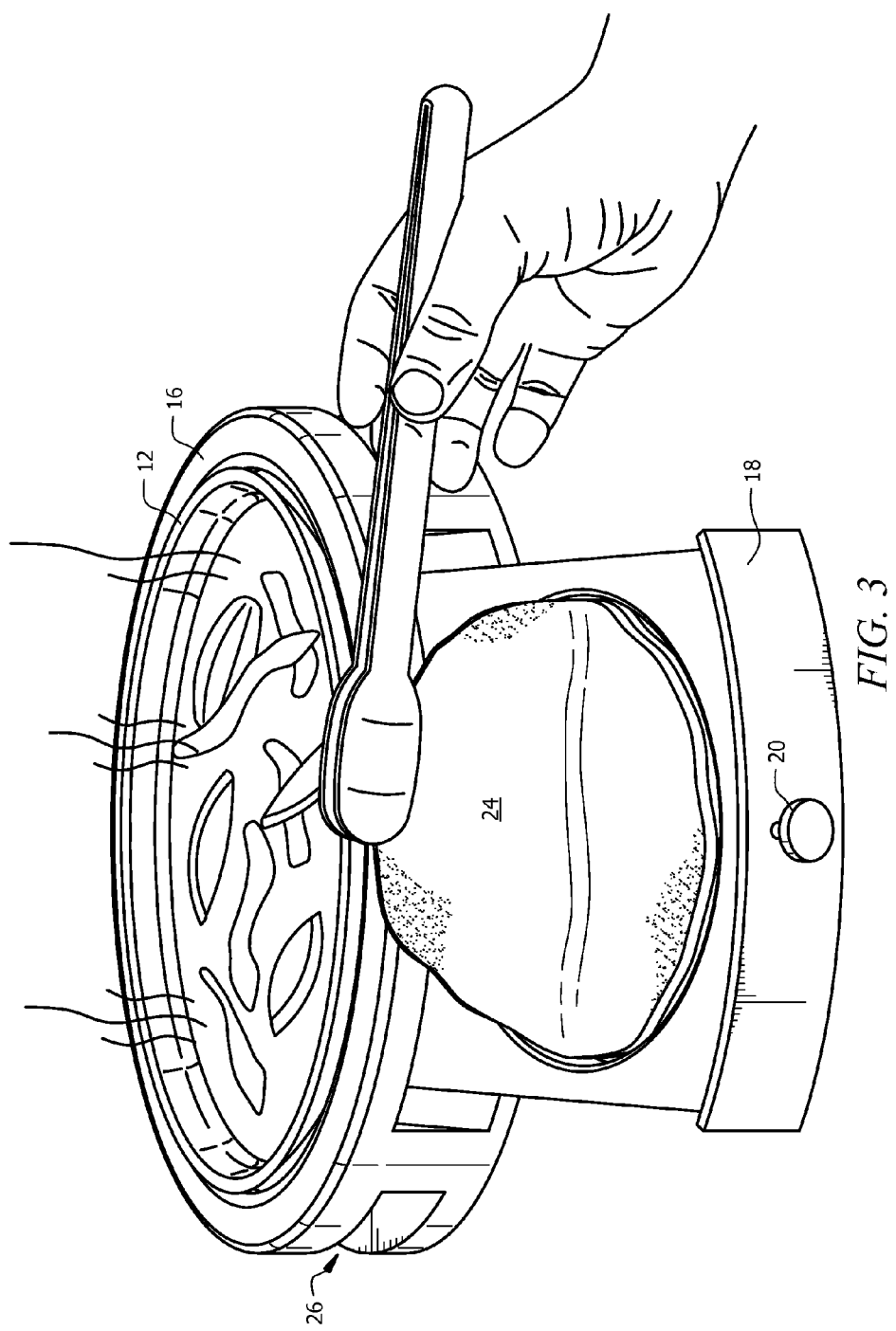
FIG. 3 is a perspective view of an exemplary embodiment of a fajita meal serving apparatus according to the present disclosure.
Figure 4:
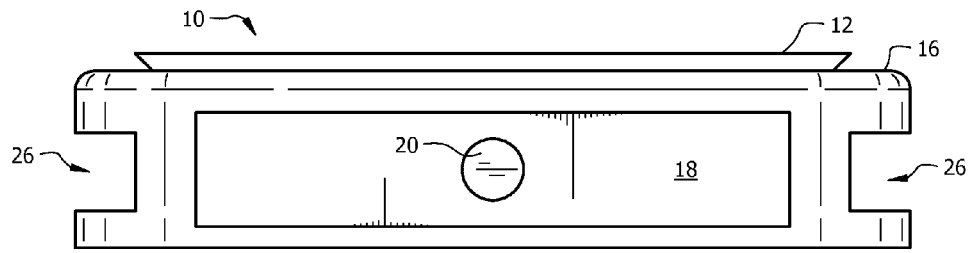
FIGS. 4 and 5 are front and back elevational views of an exemplary embodiment of a fajita meal serving apparatus according to the present disclosure.
Figure 5:
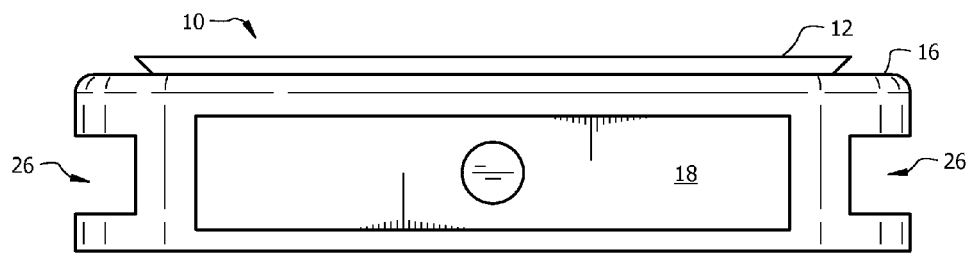
Figure 6:
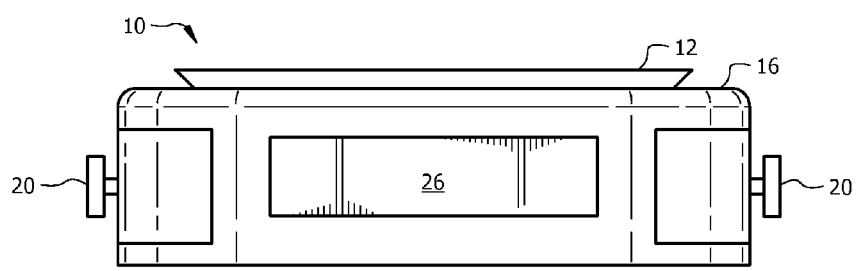
FIGS. 6 and 7 are side elevational views of an exemplary embodiment of a fajita meal serving apparatus according to the present disclosure.
Figure 7:
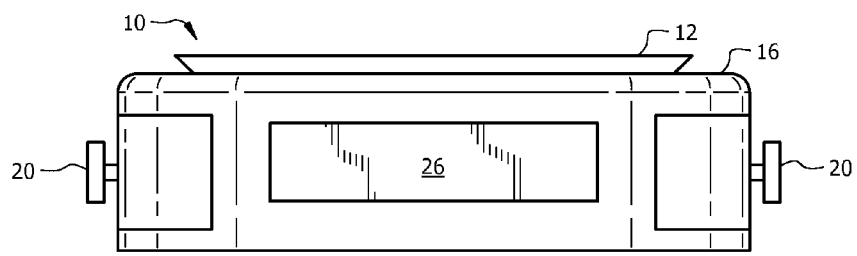
Figure 8:
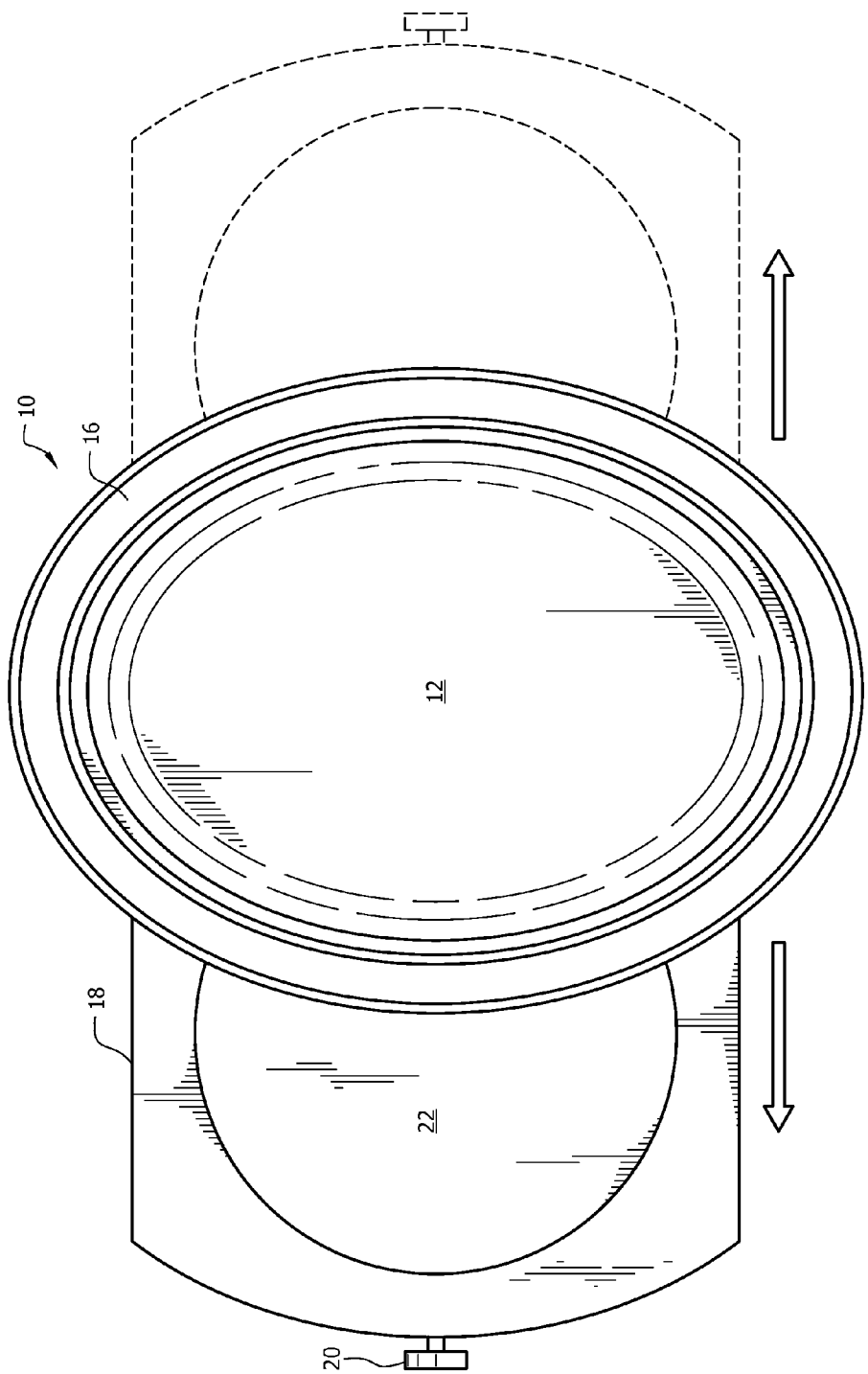
FIG. 8 is a top plan view of an exemplary embodiment of a fajita meal serving apparatus demonstrating the tortilla drawer feature according to the present disclosure.

The serving platter 16 further defines a chamber or cavity underneath the recessed area 14 with an elongated passageway for accommodating a two-way drawer 18 with drawer pulls 20 that can be opened by users seated at either side of the platter 16. As shown in FIGS. 2, 3, and 8, the two-way drawer 18 further defines a center recess 22 sized, shaped, and configured for receiving a stack of corn or flour tortillas 24. The serving platter 16 is further shaped with side recesses or slots 26 that serve as handholds to be easily held and supported by a server handling the serving apparatus 10. The slots 26 are diametrically opposed from one another and designed to provide a place for a secure hold by the server. Alternatively, thermally-insulative handle structures may be formed integral or attached to the serving platter 16.

As explicitly shown in FIG. 8, the two-way drawer 18 enables users seated on either side of the serving platter 16 to easily access the tortillas stored therein. As many restaurants serve fajita feasts for two, the two-way drawer feature is especially well-suited for those dining occasions. The tortillas stored in the drawer 18 can remain hot as they are continuously heated by the hot serving plate 12 disposed above the drawer. Because of the proximity of the two-way drawer 18 to the bottom of the serving plate 12, the tortillas held in the drawer 18 can stay warm from the heat from the serving plate 12 penetrating the floor 15 of the recessed area 14. Further, the storage of the tortillas below the serving plate 12 in this two-tiered structure helps to conserve the amount of space needed to accommodate the many components of a fajita meal on the table.

Figure 9:
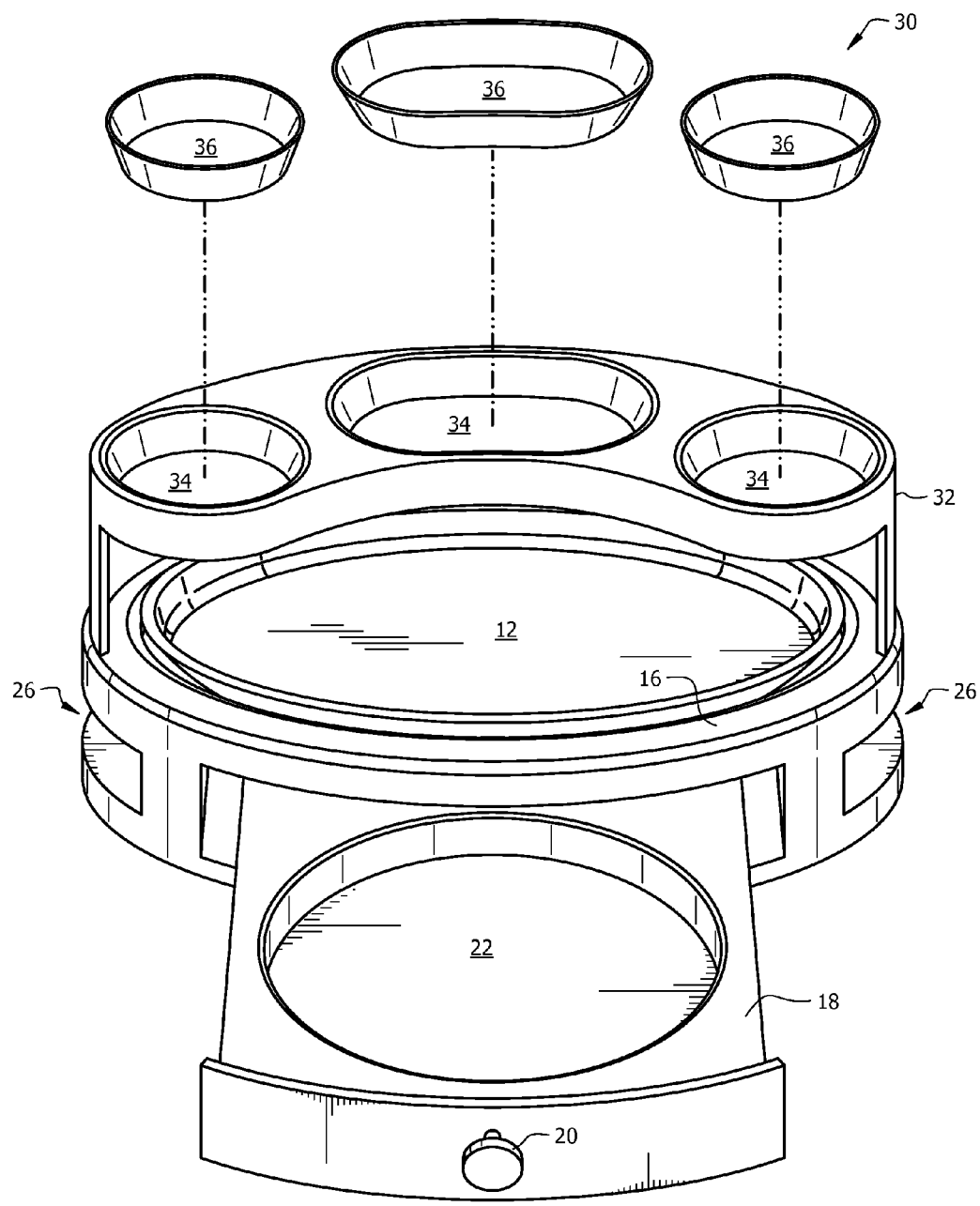
FIG. 9 is a perspective view of another exemplary embodiment of a fajita meal serving apparatus with an elevated serving shelf according to the present disclosure.

FIG. 9 is a perspective view of another exemplary embodiment of a three-tiered fajita meal serving apparatus 30 further equipped with an elevated serving shelf 32 according to the present disclosure. The elevated serving shelf 32 is coupled to the serving platter 16 and is disposed above the serving platter 16 to form a third tier for serving food. The elevated serving shelf 32 may be integral to the serving platter 16 or may be attached and easily detached for cleaning. The support columns of the elevated serving shelf 32 do not obstruct or hinder access to the food placed on the serving plate 12 nor the removal of the serving plate 12 from the serving platter 16. The elevated serving shelf 32 includes a plurality of recessed areas 34 that can accommodate a number of toppings that are typically part of a fajita meal, such as sour cream, cheese, guacamole, shredded lettuce, and diced tomatoes. The recessed areas 34 may directly hold the toppings or alternatively be used with a plurality of similarly shaped and configured dishes or food containers 36. In the embodiment shown in FIG. 9, three recessed areas 34 are formed in the elevated serving shelf 32, a larger center recessed area with smaller recessed areas on either side. However, other numbers, shapes, and configuration of recessed areas are contemplated herein.

In an alternative embodiment, the elevated serving shelf 32 defines a number of openings that are sized, shaped, and configured to receive dishes and containers 36 used to securely hold the toppings. The recessed topping embodiment may be advantageous over the embodiment with openings as the toppings are better insulated from the heat given off from the fajita meat and hot serving plate 12 below them. The present disclosure contemplates an elevated serving shelf 32 that may have any number and shape of openings for this purpose.

The present disclosure contemplates a variety of possible overall shape and configuration for the elevated serving shelf 32 as well as the recesses/openings 34 for holding the toppings. It is contemplated that the serving shelf may be movable along one column to enable it to be displaced to a plurality of positions selectable by the user. It is further contemplated that the serving apparatus may include more than one serving shelf disposed above the serving plate.

The serving platter 16 with the two-way drawer 18 and shelf 32 are preferably constructed of a rigid and not easily breakable material that is food contact-safe and can withstand high temperatures. The material must also be dishwasher-safe and provide a degree of thermal insulation so that the server may safely touch and transfer the serving platter 16 from the kitchen to the table, and that the table top is protected from the high temperatures of the serving plate 12. The two-way drawer 18 and shelf 32 may be constructed from the same or different materials as the serving platter 16. Currently, a number of materials are suitable for the construction of the serving platter 16, such as BMC (Bulk Molding Compounds, Inc. of West Chicago, Ill.) thermoplastics or thermoset plastics, and FORTRON 1140L4 polyphenylene sulfide plastic, both approved by the FDA (Food and Drug Administration) and the NSA (National Science Administration) for use with food items. The serving platter 16 may also be molded from multiple layers of different plastics to take advantage of the various properties of these materials. The present disclosure contemplates the construction of the serving platter 16 using any suitable material now known or to be developed in the future as long as it is food contact-safe, dishwasher-safe, thermally insulating, and not easily breakable. Any current or future manufacturing method is contemplated herein, including molding, extrusion, extrusion blow molding, injection blow molding, injection molding, insert molding, and 3-D printing.

It is contemplated that the serving platter 16 may be further equipped with electrically-powered (AC or battery) heating elements that are operable to maintain a desired serving temperature in the fajita meat and tortillas. This is especially advantageous for outdoor or patio dining where the ambient temperature may be lower and/or when there is a strong breeze that would cool the food down quickly.

The features of the present invention which are believed to be novel are set forth below with particularity in the appended claims. However, modifications, variations, and changes to the exemplary embodiments described above will be apparent to those skilled in the art, and fajita meal serving apparatus described herein thus encompass such modifications, variations, and changes and are not limited to the specific embodiments described herein.

What is claimed is:

1. A fajita meal serving apparatus comprising:
    a thermally-insulative serving platter defining an upper recessed area configured for securely receiving and supporting a serving plate;
    a two-way drawer disposed in a cavity formed under the upper recessed area of the serving platter, the two-way drawer defining a storage space configured for holding tortillas;
    first and second diametrically opposed handles formed in the serving platter; and
    an elevated serving shelf disposed above the upper recessed area configured for holding a plurality of toppings.

2. The fajita meal serving apparatus of claim 1, wherein the elevated serving shelf is attached to and disposed above the upper recessed area and defining a plurality of recesses for holding a plurality of toppings.

3. The fajita meal serving apparatus of claim 1, wherein the elevated serving shelf is attached to and disposed above the upper recessed area and defining a plurality of recesses for securely receiving a plurality of dishes holding a plurality of toppings.

4. The fajita meal serving apparatus of claim 1, wherein the elevated serving shelf is attached to and disposed above the upper recessed area and defining a plurality of openings for securely receiving a plurality of dishes holding a plurality of toppings.

5. The fajita meal serving apparatus of claim 1, wherein first and second handles comprise slots formed in the serving platter.

6. The fajita meal serving apparatus of claim 1, wherein the serving platter is constructed of a rigid, thermally-insulative, food contact-safe, not easily breakable, and dishwasher-safe material.

7. The fajita meal serving apparatus of claim 1, wherein the serving platter is constructed of a rigid, thermally-insulative, food contact-safe, and dishwasher-safe plastic material.

8. A meal serving apparatus comprising:
    a top tier having a thermally-insulative serving platter defining an upper recessed area configured for securely receiving and supporting a serving plate; and
    a bottom tier having a two-way drawer accessible on two sides of the serving platter and defining a circular recess configured for holding a food item and disposed in a cavity under the upper recessed area of the serving platter.

9. The meal serving apparatus of claim 8, further comprising an elevated serving shelf disposed above the upper recessed area configured for holding a plurality of food items.

10. The meal serving apparatus of claim 8, further comprising an elevated serving shelf attached and disposed above the top tier upper recessed area and defining a plurality of recesses for holding a plurality of food items.

11. The meal serving apparatus of claim 8, further comprising an elevated serving shelf attached and disposed above the top tier upper recessed area and defining a plurality of recesses for securely receiving a plurality of dishes holding a plurality of food items.

12. The meal serving apparatus of claim 8, further comprising an elevated serving shelf attached and disposed above the top tier upper recessed area and defining a plurality of openings for securely receiving a plurality of dishes holding a plurality of food items.

13. The meal serving apparatus of claim 8, wherein the serving platter comprises first and second handles.

14. The meal serving apparatus of claim 8, wherein the serving platter is constructed of a rigid, thermally-insulative, food contact-safe, not easily breakable, and dishwasher-safe plastic material.

15. The meal serving apparatus of claim 8, wherein the serving platter is constructed of a rigid, thermally-insulative, food contact-safe, and dishwasher-safe material.

16. A three-tiered compact food serving apparatus comprising:
- a serving platter defining a first recessed area configured for holding a first food item;
- a two-way drawer disposed in a cavity under the upper recessed area of the serving platter, the two-way drawer defining a second recessed area configured for holding a second food item;
- an elevated serving shelf disposed above the first recessed area configured for holding a plurality of third food items; and
- first and second diametrically opposed handles.

17. The food serving apparatus of claim 16, further comprising a cast iron serving plate securely held in the first recessed area.

18. The food serving apparatus of claim 16, further comprising a heating element disposed below the first recessed area.

* * * * *